Figure 1:
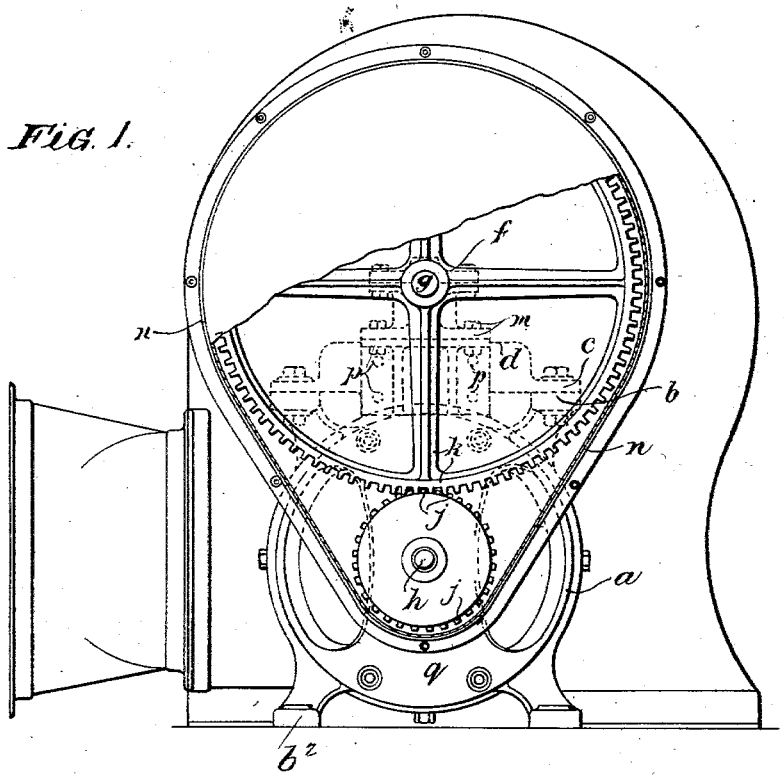

No. 746,683. PATENTED DEC. 15, 1903.
S. C. DAVIDSON.
BACK GEARING.
APPLICATION FILED APR. 15, 1903.
NO MODEL. 6 SHEETS—SHEET 1.

WITNESSES: INVENTOR:
Fred White Samuel Cleland Davidson,
Thomas Wallace By his Attorneys:
Arthur C. Fraser No. 746,683. PATENTED DEC. 15, 1903.
S. C. DAVIDSON.
BACK GEARING.
APPLICATION FILED APR. 15, 1903.
NO MODEL. 6 SHEETS—SHEET 3.

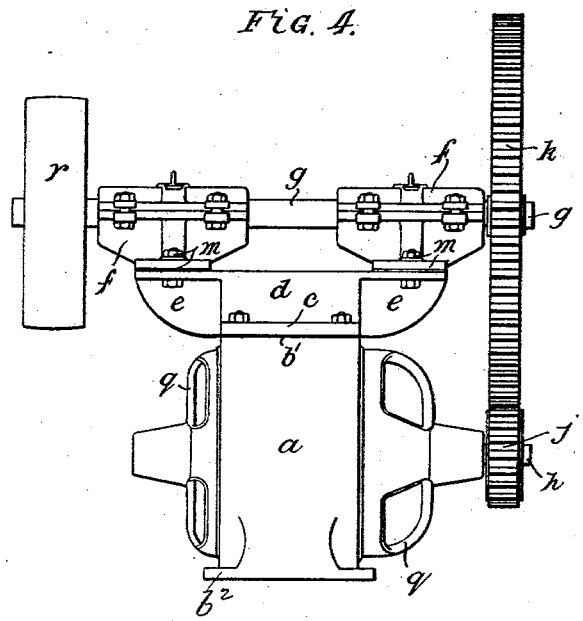
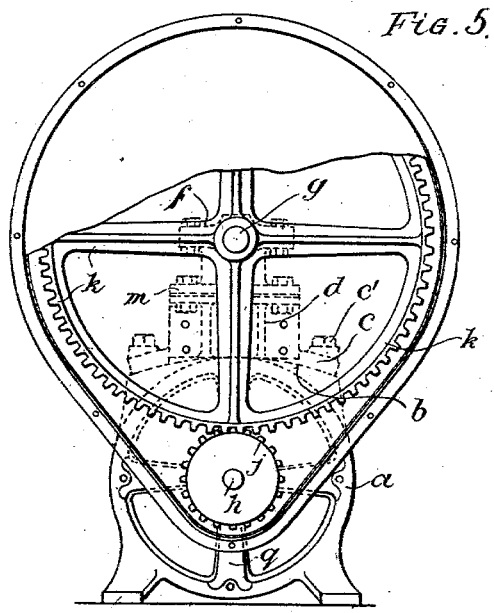

No. 746,683. PATENTED DEC. 15, 1903.
S. C. DAVIDSON.
BACK GEARING.
APPLICATION FILED APR. 15, 1903.
NO MODEL. 6 SHEETS—SHEET 5.

WITNESSES: Fred White, Thomas F. Wallace

INVENTOR: Samuel Cleland Davidson,
By his Attorneys

No. 746,683. PATENTED DEC. 15, 1903.
S. C. DAVIDSON.
BACK GEARING.
APPLICATION FILED APR. 15, 1903.
NO MODEL. 6 SHEETS—SHEET 6.

WITNESSES:

INVENTOR:
Samuel Cleland Davidson
By Attorneys,

No. 746,683. Patented December 15, 1903.

UNITED STATES PATENT OFFICE.

SAMUEL CLELAND DAVIDSON, OF BELFAST, IRELAND.

BACK-GEARING.

SPECIFICATION forming part of Letters Patent No. 746,683, dated December 15, 1903.

Application filed April 15, 1903. Serial No. 152,725. (No model.)

*To all whom it may concern:*

Be it known that I, SAMUEL CLELAND DAVIDSON, a subject of the King of Great Britain and Ireland, residing at Belfast, Ireland, have invented certain new and useful Improvements in Back-Gearing, of which the following is a specification.

My improvements relate to the construction and application to the exterior surfaces of electric motors or dynamos and steam or water driven turbines (hereinafter referred to as the "motor") of a device externally mounted thereon for carrying the bearings of a shaft (hereinafter referred to as the "back-gear" shaft) which is parallel with and driven from the motor-shaft by gear-wheels or by sprocket-wheels and chain, whereby said back-gear shaft can be rotated at any required relative speed to that of the motor-shaft.

In combinations of electric motors and back-gear shafts as hitherto made the bearings for said shaft are usually an integral part of or directly mounted on the shell of the field-magnets or on the casing of the motor or upon the end plates thereof, and consequently said bearings are so close to one another (more particularly when mounted upon small motors) that if the gear-shaft carried thereby be projected beyond the outer ends of these bearings to a sufficient extent for a pulley or other driven article mounted on its terminal ends to rotate in a plane beyond the terminal ends of the motor-shaft there will be a substantial length of said back-gear shaft between said driven article and the nearest bearing of the back-gear shaft unsupported, and consequently liable to an oscillating motion, which tends to an undue amount of wear in these bearings and to work them out of true alinement with one another or to heat up and seize upon the shaft, and when in order to increase the distance between the bearings and reduce the amount of unsupported overhang of the terminal ends of the gear-shaft said bearings are mounted on the end plates of the inclosing casing of the motor there is a further disadvantage in that if anything goes wrong with the armature or wheel in the motor, so as to necessitate its removal, the whole gearing has to be dismantled in order to withdraw same therefrom.

My invention has for its object to obviate these defects and obtain advantages hereinafter mentioned; and the invention consists in the employment of a detachable pedestal (hereinafter called the "back-gear" pedestal) constructed as one integral piece with its under surface or base suitably shaped to fit evenly upon any suitable portion of the external surface of the motor, whether same be specially shaped therefor or of ordinary construction, provided there is available thereon a sufficient surface clear of connections or other requisite fittings of the motor for mounting and rigidly attaching the base of said pedestal thereon. The body and upper surface of said back-gear pedestal are suitably designed as by being elongated or spread out in the direction of the axes of the shaft and motor to carry and firmly support the bearings for the opposite ends of the back-gear shaft at the terminal ends of the pedestal and at such distance apart from one another that a pulley or other driven article mounted on the end of said gear-shaft can rotate in a plane which is clear not only of the body of the motor, but also of the ends of the motor-shaft, and said bearings may be made either integrally with the body of said back-gear pedestal or as a detachable fitting thereon.

Reference to the accompanying drawings will more fully explain the nature of my invention and how same is carried into effect.

Figure 2:
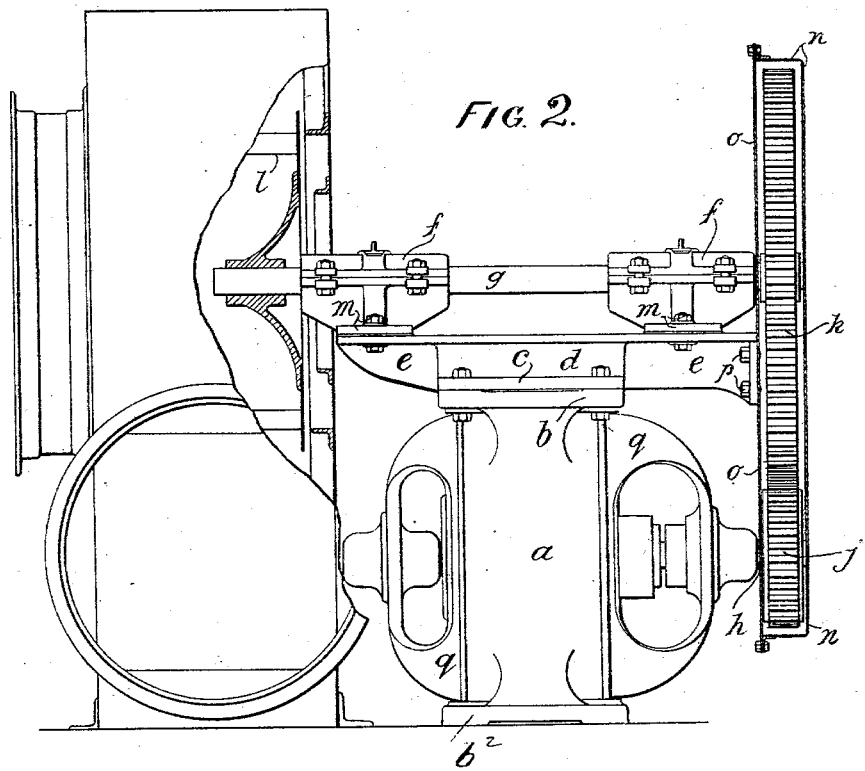
Figure 3:
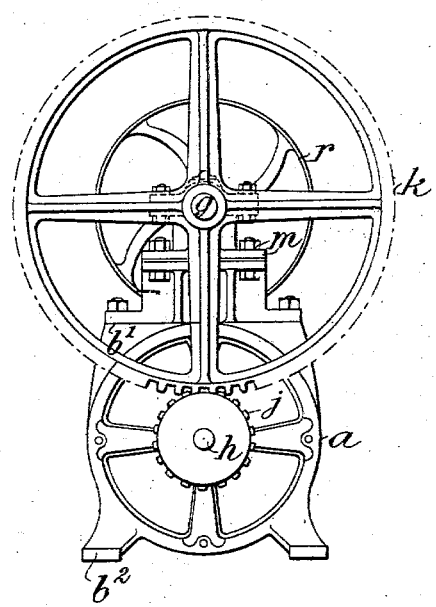
Figure 8:
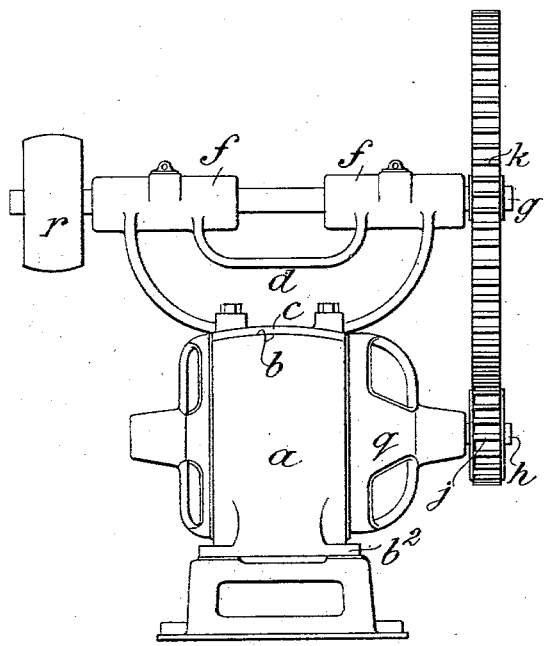
Figure 6:
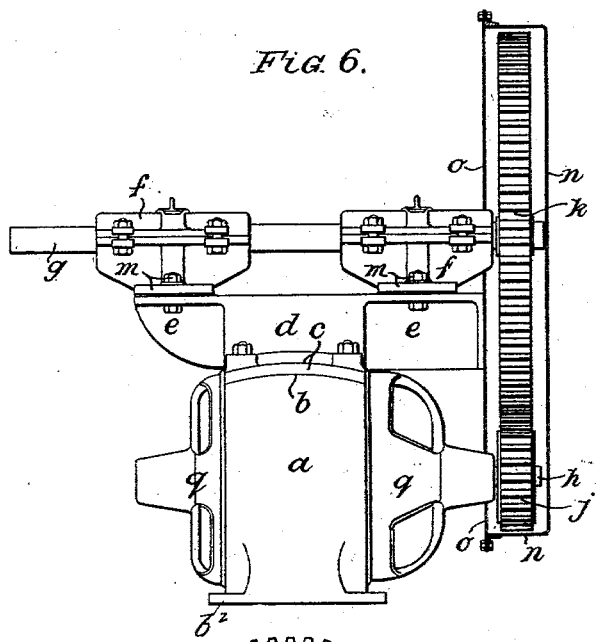
Figure 7:
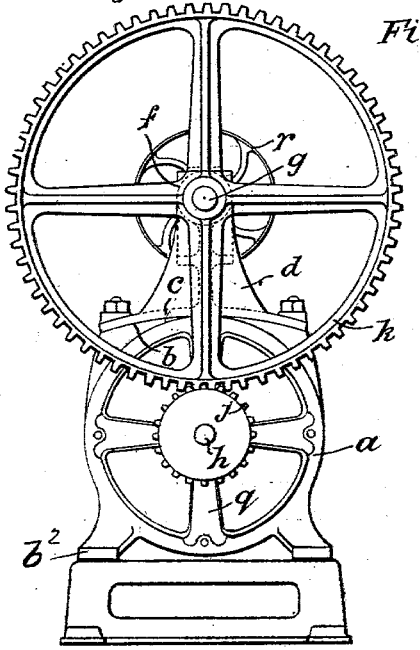
Figure 9:
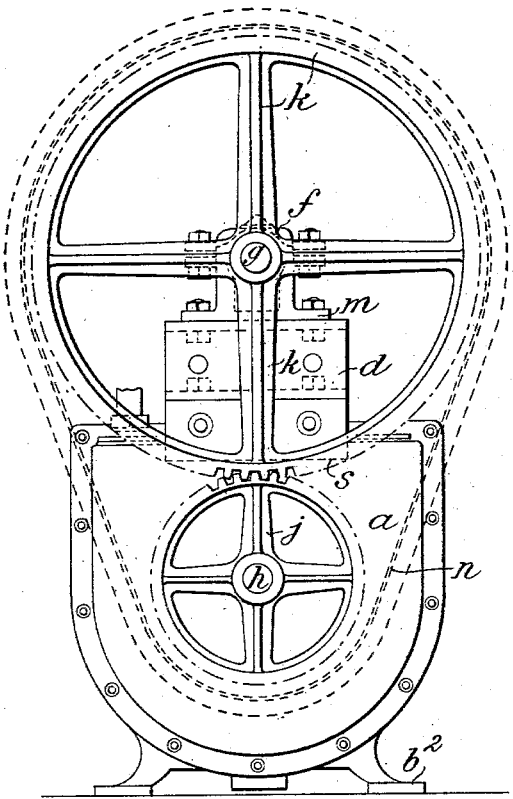
Figure 10:
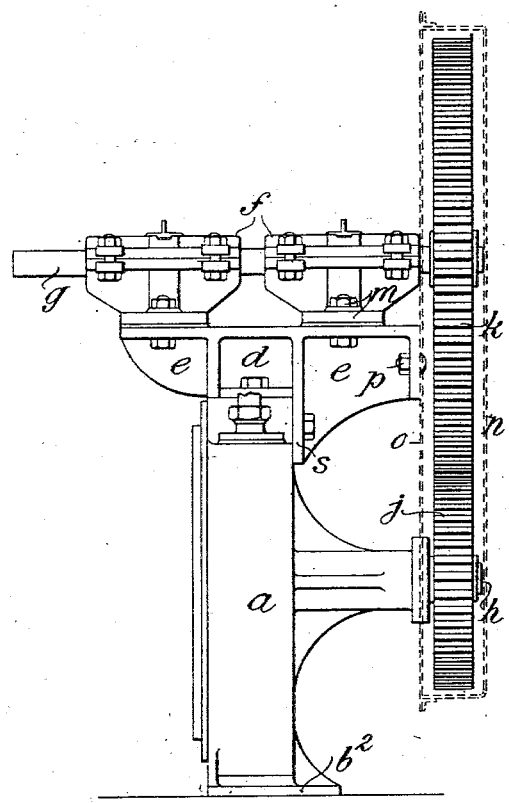

Figures 1 and 2 are respectively a front elevation and a side elevation, partly in section, of my preferred construction. Figs. 3 and 4 are similar views to Figs. 1 and 2 and showing a modified construction. Figs. 5 and 6 show the application of my invention to an electric motor of ordinary construction. Figs. 7 and 8 show another modification of my invention with the bearings for the back-gear shaft constructed as an integral part of the gear-pedestal. Figs. 9 and 10 are respectively a front elevation and an end elevation, showing the application of my invention in combination with a Pelton wheel water-motor.

In Figs. 1 and 2 the surface for supporting the detachable gear-pedestal is formed by constructing the top of the field-magnet shell of the motor with feet similar to the motor pedestal or feet on which the motor stands, but projecting upwardly therefrom, and thereby providing a rigid support upon which the base of the detachable gear-pedestal can be secured firmly by bolts or other convenient form of attachment. It will be obvious that this construction of the motor has also a special advantage, in that it enables the motor to be bolted to a ceiling by the said projecting feet, in which case the gear-pedestal would be inverted and secured to the ordinary basement-feet of the motor.

In the figures, $a$ is the field-magnet shell of the motor, $b$ the upwardly-facing surface of the top feet, said surfaces being in one even plane and having the base $c$ of the gear-pedestal $d$ bolted thereto.

$b^2$ $b^2$ are the feet or pedestal of the motor.

$e$ $e$ are the terminal ends or wings of the gear-pedestal, which are projected beyond said base $c$, parallel with the axis of the motor sufficiently to carry the bearings $ff$ at a greater distance apart from one another than the terminal ends of the motor-bearings, and so as to permit the fan $l$, which is mounted on one end of the shaft $g$, carried in said bearings, to rotate in a plane clear of the ends of the motor $a$.

$h$ is the motor-spindle on which is mounted a spur-wheel $j$, gearing into a spur-wheel $k$, carried on said back-gear shaft $g$, and it will be obvious that the speed of this back-gear shaft can be adjusted in the usual manner relatively to that of the motor-spindle in accordance with the relative diameters of the spur-wheels applied on said shafts. The bearings $ff$ are shown in these figures as detachable from the gear-pedestal and connected to the ends or wings $e$ $e$ of the pedestal by flanges and bolts $m$ $m$.

$n$ is a gear-case cover which is attached to an annular ring $o$, carried on one end of the back-gear pedestal, which is suitably shaped to receive same, the said ring being attached by bolts $p$.

It will be seen that when the back-gear pedestal is mounted upon the upwardly-facing surfaces of the top feet of the motor the terminal ends $e$ $e$ are clear of the end plates $q$ $q$ of the motor, so that these can be removed, if required, for any reason without interfering with or dismantling the back-gearing.

In the modification of my invention shown in Figs. 3 and 4 the field-magnet shell $a$ of the motor is constructed with a flat top or tabular surface $b'$. In this case the gear-pedestal is shown with both ends or wings curved upward, and the gear-case is dispensed with, a pulley $r$ being shown mounted on the end of the gear-shaft in lieu of a fan. In other respects the drawings are similar, and similar letters of reference indicate the corresponding parts in each case.

In Figs. 5 and 6 the field-magnet shell is shown formed with a curved tabular surface $b$, and the base $c$ of the gear-pedestal is correspondingly curved for attachment thereto by screws or studs, as indicated at $c'$. Otherwise the construction is similar to that shown in Figs. 1 and 2, and similar letters of reference indicate corresponding parts in these figures also. One end of the gear-shaft in this case is simply shown projecting beyond the end of one of the bearings, no driven article being mounted thereon, it being understood that a pulley, fan, or other appliance to be rotated may be so mounted.

In the construction shown in Figs. 7 and 8 the general arrangement is similar to that shown in Figs. 5 and 6 with the exception that the bearings for the back-gear shaft are constructed as an integral part of the back-gear pedestal. The same letters of reference indicate corresponding parts in these figures to those indicated in respect of Figs. 5 and 6.

In Figs. 9 and 10 the invention is shown combined with a Pelton wheel water-motor, and with the exception that the pedestal is shortened to correspond with the width of the motor and fits on the vertical side face of the motor, as at $s$, the general arrangement of the apparatus is similar to that described and shown in the other figures, where a gear-case is shown fitted. Similar letters of reference indicate corresponding parts in both cases.

It will be obvious that the motion from the motor-spindle to the back-gear shaft may be transmitted either through gear-wheels, the relative diameters of which may be varied to give any required speed of revolution on the back-gear shaft, or by means of sprocket-wheels and chain, such as employed in bicycles.

The gear or sprocket wheels on the gear-shaft may be mounted thereon either upon the opposite end from that carrying the pulley, fan, or other driven article, or may be applied between said driven article and the nearest bearing thereto on the gear-pedestal, as may be preferred to suit the circumstances of the case.

It will be obvious that my improved device is adaptable for varying circumstances and permits of the same motor being used either with or without back-gearing attachment or with the substitution of one back-gear pedestal for another, so that the plane of rotation of the driven article on either end of the back-gear shaft may be projected to any required clearance beyond the ends of the motor-shaft without any undue vibration or oscillation and without requiring the gearing to be dismantled in the event of its being necessary from any cause to withdraw the armature or turbine-wheel from the motor, and, further, that as the gear-pedestal itself is in one integral piece the bearings mounted theron always remain in true alinement with one another, and at same time the whole arrangement combines efficiency with cheapness of cost and convenience of application.

What I claim, and desire to secure by Letters Patent, is—

1. The combination of a motor and its casing, a motor-shaft, a back-gear shaft driven by said motor, gearing between the motor and one end of said back-gear shaft, a device to be driven on the other end of said back-gear shaft, a detachable back-gear pedestal formed as an elongated structure fitted to the motor-casing with its terminal ends projecting out therefrom in the direction of the axes of motor and back-gear shaft and beyond the motor-casing, bearings mounted on said pedestal at the extremities of its terminal ends whereby the said bearings are so spaced apart as to support the back-gear shaft close to the gearing on one side and to the device to be driven on the other so that said device can rotate in a plane which is clear of the ends of the motor substantially as and for the purpose set forth.

2. The combination of a motor with its casing and shaft, a back-gear shaft to be driven from the motor, a gear carried by one end of said shaft and connected with the motor, an article to be rotated at the other end of said shaft, the said article being so disposed as to rotate in a plane clear of the end of the motor, and a T-shaped detachable pedestal fitted to the motor-casing and having its arms spread out in the direction of the axis of the motor and formed with bearings for said shaft at the extremities of the arms whereby said bearings are brought up to and support the back-gear shaft close to said article to be rotated and the gear through which the back-gear shaft is driven, substantially as and for the purpose set forth.

3. The combination of a motor with casing and shaft, a back-gear shaft to be driven from the motor, an article to be driven by said motor and fitted on one end of said back-gear shaft, a gear at the other end of said back-gear shaft driven directly from said motor, said article rotating in a plane clear of said motor, bearings for said back-gear shaft fitted close against the article to be driven at one end and the driving-gearing at the other end, a detachable pedestal fitted to the motor-casing and spread out therefrom in a line parallel to the motor and shaft axes so as to support and carry said bearings at the terminal ends of said pedestal which ends are a greater distance apart from one another than the distance between the terminal ends of the motor-shaft, substantially as set forth.

4. The combination of a motor and its shell, a motor-shaft, a back-gear shaft driven by said motor, gearing between the motor and one end of said back-gear shaft, the shell having projections formed on its top and bottom surfaces, one set of projections serving to support the motor-casing, a detachable pedestal fitted to the other set of projections on the motor-casing, said detachable pedestal being elongated beyond the ends of the motor in the direction of the axes of motor and shaft, bearings mounted on said pedestal at the terminal ends thereof whereby the bearings are brought up to and support the back-gear shaft close to the gearing and to the device to be driven and so that said device can rotate in a plane which is clear of the ends of the motor, substantially as and for the purpose set forth.

5. The combination of a motor and its casing, a motor-shaft, a back-gear shaft driven by said motor, gearing between the motor and one end of said back-gear shaft, bearings for said back-gear shaft, the motor-casing having a tabular surface formed on its top, a detachable pedestal formed with a base adapted to fit said tabular surface on the motor-casing, said pedestal being so elongated in the direction of the axis of the motor and shaft that the said bearings which are carried by the terminal ends of the pedestal are farther apart from one another than the terminal ends of the bearing of the motor-shaft whereby said bearings are brought up to and support the shaft close to the gearing and also to the device to be driven and so that said device can rotate in a plane which is clear of the ends of the motor-shaft, substantially as set forth.

6. The combination of a motor and its casing, a motor-shaft, a back-gear shaft driven by said motor, gearing between the motor and one end of said back-gear shaft, the motor-casing having a curved tabular surface formed on it, a detachable pedestal formed with a base adapted to fit said curved tabular surface on the motor-casing, said pedestal being formed as an integral elongated structure having its terminal ends farther apart from one another than those of the motor-shaft, bearings mounted on the terminal ends of said detachable pedestal whereby said bearings are brought up to support the back-gear shaft close to the gearing and the device to be driven and said device can rotate in a plane which is clear of the ends of the motor, substantially as and for the purpose set forth.

7. The combination of a motor and its casing, a motor-shaft, a back-gear shaft driven by said motor, gearing between the motor and one end of said back-gear shaft, a pedestal detachably fitted to the motor-casing, said pedestal being formed as an elongated integral structure having formed integral with its extremities bearings for said back-gear shaft, whereby the bearings are brought up close to and support the shaft close to the gearing and the device to be driven and said device can rotate in a plane which is clear of the ends of the motor-shaft, substantially as and for the purpose set forth.

8. The combination of a motor and its casing, a back-gear shaft driven by said motor, gearing between the motor and one end of said back-gear shaft, a casing for said gearing, a device to be driven on the other end of said back-gear shaft, a detachable pedestal fitted to the motor-casing and formed as an integral structure elongated in the direction of the under shaft and made at one of its terminal ends with a vertical face for receiving and holding the casing to inclose the gearing which drives the back-gear shaft, bearings provided on said pedestal at its terminal ends whereby the bearings are so spaced apart that they support the shaft close to the gearing and to the device to be driven so that said device can rotate in a plane which is clear of the ends of the motor-shaft, substantially as and for the purpose set forth.

9. The combination of a motor and its casing provided with a motor-pedestal, a motor-shaft, a back-gear shaft driven by said motor, a back-gear pedestal consisting of an elongated structure attached to the motor-casing and supported thereby and carrying bearings for said back-gear shaft.

10. The combination of a motor and its casing, a motor-shaft, a back-gear shaft driven by said motor, an article to be rotated on an end of said back-gear shaft, a back-gear pedestal consisting of a structure attached to the motor-casing with its end adjacent to said article carrying a bearing for said back-gear shaft projecting beyond the end of the motor-shaft so as to support the back-gear shaft close to the article while permitting the article to rotate in a plane beyond the end of the motor-shaft.

In witness whereof I have hereunto signed my name in the presence of two subscribing witnesses.

SAMUEL CLELAND DAVIDSON.

Witnesses:
GEORGE G. WARD,
WM. FREIL.